United States Patent
Ching et al.

(10) Patent No.: US 11,906,095 B2
(45) Date of Patent: Feb. 20, 2024

(54) COMBINED METAL / PLASTIC TUBING APPARATUSES AND METHODS OF MANUFACTURE

(71) Applicant: GOODRICH CORPORATION, Charlotte, NC (US)

(72) Inventors: Nathaniel Ching, Hartville, OH (US); Jin Hu, Hudson, OH (US); Ramesh Achutha Rao, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 459 days.

(21) Appl. No.: 17/135,351

(22) Filed: Dec. 28, 2020

(65) Prior Publication Data

US 2022/0205573 A1    Jun. 30, 2022

(51) Int. Cl.
*F16L 47/24* (2006.01)

(52) U.S. Cl.
CPC .................................... *F16L 47/24* (2013.01)

(58) Field of Classification Search
CPC .. F16L 47/24; B29C 66/1142; B29C 66/5221; B29C 66/223
USPC ........................................................ 285/913
See application file for complete search history.

(56) References Cited

U.S. PATENT DOCUMENTS

| | | | | |
|---|---|---|---|---|
| 3,989,280 A | * | 11/1976 | Schwarz | B29C 66/52297 285/55 |
| 4,093,280 A | * | 6/1978 | Yoshizawa | F16L 47/24 285/915 |
| 4,512,596 A | * | 4/1985 | Obrecht | F16D 1/02 285/330 |
| 4,712,809 A | * | 12/1987 | Legris | B29C 66/73152 29/DIG. 24 |
| 4,905,766 A | * | 3/1990 | Dietz | F16L 47/24 285/239 |
| 5,109,929 A | * | 5/1992 | Spears | F16L 47/24 169/37 |
| 8,840,148 B2 | * | 9/2014 | Defilippi | G01L 19/0007 285/133.4 |
| 9,500,305 B2 | | 11/2016 | Lee et al. | |

(Continued)

FOREIGN PATENT DOCUMENTS

| | | | | |
|---|---|---|---|---|
| DE | 60319546 | | 4/2009 | |
| EP | 1369635 A1 | * | 12/2003 | ......... B29C 37/0082 |
| EP | 3222862 | | 9/2017 | |

(Continued)

OTHER PUBLICATIONS

European Patent Office; European Search Report dated May 23, 2022 in application No. 21217977.4.

*Primary Examiner* — James M Hewitt, II
(74) *Attorney, Agent, or Firm* — SNELL & WILMER L.L.P.

(57) ABSTRACT

An apparatus may comprise: a metal pipe portion extending from a first end to a first transition end and defining a first radially outer surface and a first radially inner surface, the first transition end comprising a first tooth element and a second tooth element disposed circumferentially adjacent to the first tooth element; and a polymeric pipe portion having a second transition end and defining a second radially outer surface and a second radially inner surface, the second transition end having a complimentary shape to the first transition end, the second transition end coupled to the first transition end.

17 Claims, 7 Drawing Sheets

(56) References Cited

U.S. PATENT DOCUMENTS 11,326,730 B2 * 5/2022 Hidley .................... F16L 47/24
2008/0028592 A1 2/2008 Stieler et al.

FOREIGN PATENT DOCUMENTS

| WO | 1996014533 | 5/1996 |
| WO | 2004106038 | 12/2004 |
| WO | 2014043477 | 3/2014 |

* cited by examiner

COMBINED METAL / PLASTIC TUBING APPARATUSES AND METHODS OF MANUFACTURE

FIELD

The present disclosure is directed to plumbing systems, and more particularly to aircraft plumbing systems with combined metal/plastic tubing for use in a potable water system, the associated drain system, and/or a fuel or lubricant system.

BACKGROUND

Plastic tubing is much lighter than metal tubing. Typical fittings, couplings, and adapters for plumbing systems are designed for metal tubing. For example, some couplings included threaded connections designed for metal to metal interfaces. Similarly, methods of coupling metal fittings to metal tubing is inexpensive, consistent, and relatively fast for manufacturing. During operation of various plumbing systems, the plumbing may be exposed to a range of temperatures depending on the specific use of the plumbing systems. Exposing a material to a wide range of temperatures results in thermal growth of the tubing, which may vary between materials.

SUMMARY

An apparatus is disclosed herein. The apparatus may comprise: a metal pipe portion extending from a first end to a first transition end and defining a first radially outer surface and a first radially inner surface, the first transition end comprising a first tooth element and a second tooth element disposed circumferentially adjacent to the first tooth element; and a polymeric pipe portion having a second transition end and defining a second radially outer surface and a second radially inner surface, the second transition end having a complimentary shape to the first transition end, the second transition end coupled to the first transition end.

In various embodiments, the first tooth element comprises a first axial peak, a first axial valley, and a first transition portion extending axially and circumferentially from the first axial valley to the first axial peak. The first axial valley may have a first axial distance from the first end. The first axial peak may have a second axial distance from the first end. The second axial distance may be greater than the first axial distance. The first axial distance and the second axial distance may be measured along a centerline defined by the first radially inner surface. The first axial valley may extend radially and axially from the first radially outer surface to the first radially inner surface. The second tooth element may comprise a second axial peak and a second transition portion, and the second transition portion may extend axially and circumferentially from the first axial valley to the second axial peak. The second transition end may comprise a third tooth element having a third axial peak, the third axial peak disposed adjacent to the first axial valley of the first transition end. The first transition end and the second transition end may define a transition region, wherein the transition region is configured to create a uniform transition in stiffness between the metal pipe portion and the polymeric pipe portion. The first end may be coupled to a metal fitting.

A tube assembly is disclosed herein. The tube assembly may comprise: a metal pipe portion extending from a first end to a first transition end, the first transition end comprising a first tooth element and a second tooth element disposed circumferentially adjacent to the first tooth element; and a polymeric pipe portion having a second transition end, the second transition end having a complimentary shape to the first transition end, the second transition end coupled to the first transition end; and a metal fitting coupled to the first end.

In various embodiments, the first tooth element may comprise a first axial peak, a first axial valley, and a first transition portion extending axially and circumferentially from the first axial valley to the first axial peak. The first axial valley may have a first axial distance from the first end. The first axial peak may have a second axial distance from the first end. The second axial distance may be greater than the first axial distance. The first axial valley may extend radially and axially from a radially outer surface of the metal pipe portion to a radially inner surface of the metal pipe portion. The second tooth element may comprise a second axial peak and a second transition portion, the second transition portion extending axially and circumferentially from the first axial valley to the second axial peak. The second transition end may comprise a third tooth element having a third axial peak, the third axial peak disposed adjacent to the first axial valley of the first transition end. The first transition end and the second transition end may define a transition region, wherein the transition region is configured to create a uniform transition in stiffness between the metal pipe portion and the polymeric pipe portion.

A method of manufacturing a combined metal/plastic pipe is disclosed herein. The method may comprise: end milling an axial end of a metal pipe portion to define a first tooth and a second tooth of a first transition end of the metal pipe portion; injection molding a polymeric pipe portion having a second transition end, the second transition end being complimentary in shape to the first transition end; and coupling the first transition end to the second transition end.

In various embodiments, coupling the first transition end to the second transition end occurs in response to a liquified plastic cooling, hardening and adhering to the first transition end of the metal pipe portion. The first tooth may comprise a first axial peak and a first transition portion extending axially and circumferentially to a first axial valley. The second tooth may comprise a second axial peak and a second transition portion extending axially and circumferentially to the first axial valley.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

Figure 1:
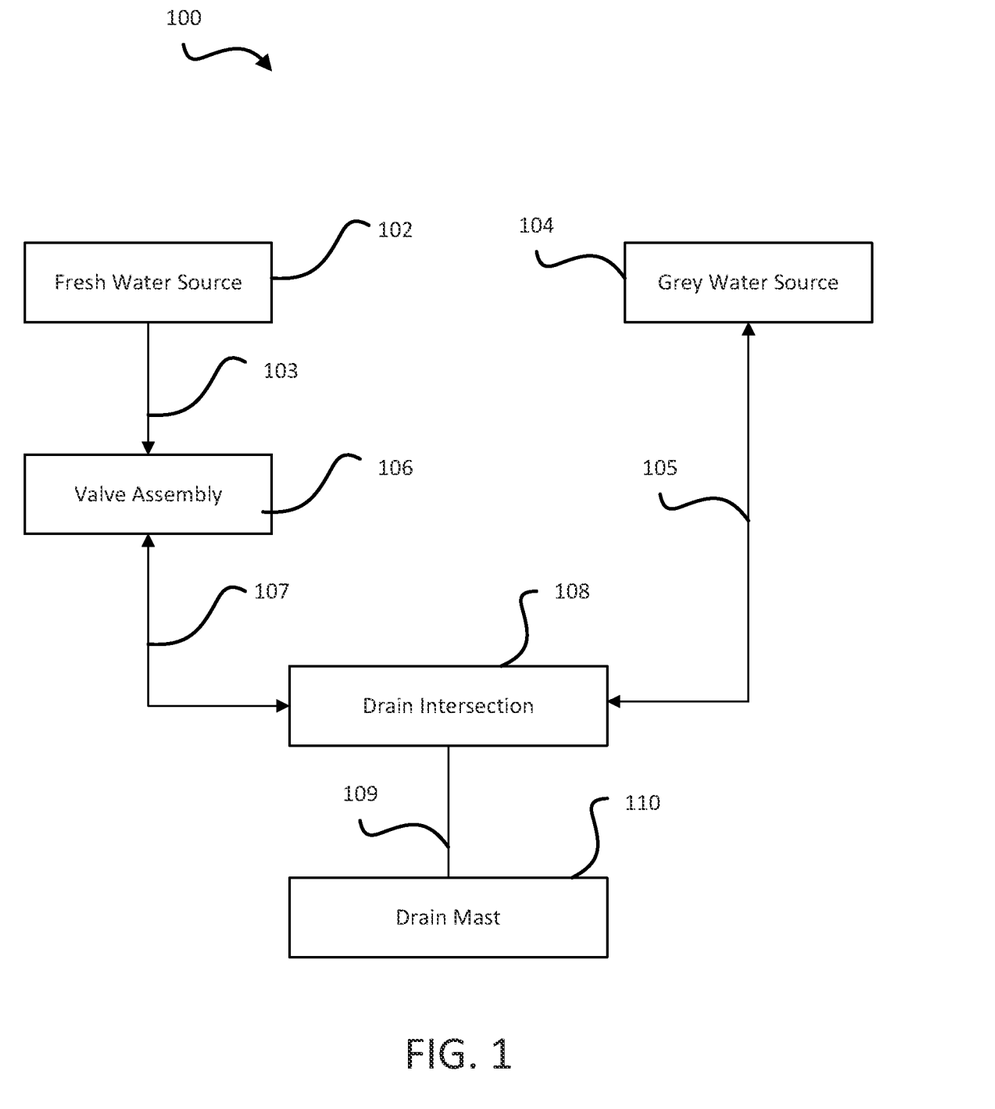
FIG. 1 illustrates block diagram of an aircraft potable water system and associated drain system, in accordance with various embodiments.

Referring now to FIG. 1, a block diagram of an aircraft potable water system 100 and associated drain system, in accordance with various embodiments is depicted. In various embodiments, the aircraft potable water system 100 and associated drain system comprises a fresh water source 102, a grey water source 104, a valve assembly 106, a drain intersection 108 and a drain mast 110. In various embodiments, the fresh water source 102 is in fluid communication with the valve assembly through a first tube assembly 103. Similarly, the grey water source 104 may be fluidly coupled to the drain intersection 108 through a second tube assembly 105, and the valve assembly 106 may be fluidly coupled to the drain intersection 108 through a third tube assembly 107. In various embodiments, upon assembly and installation of the system 100, the first tube assembly 103 may be coupled to the fresh water source 102 and the valve assembly 106. Similarly, the second tube assembly 105 may be coupled to the grey water source 104 and the drain intersection, the third tube assembly 107 may be coupled to the valve assembly 106 and the drain intersection 108, and the fourth tube assembly may be coupled to the drain intersection 109 and extend to the drain mast 110. In various embodiments, the drain mast 110 includes an open end point for various drain tubes in an aircraft draining system.

In various embodiments, a mating interface between a respective tube assembly (e.g., tube assemblies 103, 105, 107, 109) and an adjacent component (e.g., fresh water source 102 to tube assembly 103) may include a male coupling and a female coupling. For example, the fresh water source 102 may contain a male coupling and the first tube assembly 103 may contain a female coupling or vice versa. The female coupling may be configured to receive the male coupling and fluidly couple the fresh water source 102 to the first tube assembly 103, in accordance with various embodiments. In various embodiments couplings for plumbing systems include metal components (e.g., steel, nickel, or the like), since metal components may be easier to create a fluid tight seal with relative to alternative lighter materials, such as plastic. However, in some environments, plastic tubing may be desirable due to having a temperature environment with operational loads that plastic tubing could withstand.

In various embodiments, a tube assembly (e.g., any of tube assemblies 103, 105, 107, 109) may include a metal portion and a plastic portion, as described further herein. The metal portion may be coupled to a fitting (e.g., a male coupling, a female coupling, an adapter, a tee fitting, fitting known in the art). The plastic portion may extend from the metal portion to another metal portion or to an end point (e.g., the drain mast 110). In various embodiments, by having tube assemblies as disclosed herein, a weight and cost of tube assemblies (e.g., tube assemblies 103, 105, 107, 109) may be reduced for aircraft potable water system (e.g., aircraft potable water system 100). In various embodiments, the plastic portion may comprise acrylonitrile butadiene siren (ABS), chlorinated polyvinyl choloride (CPVC), high-density polyethylene (HDPE), polybutylene (PB-1), polyethylene (PE, MDPE, HDPE, etc.), polyethylene of raised temperature (PE-RT), cross-linked polyethylene (PEX), polypropylene (PP), polyvinylidene difluoride (PVDF), un-plasticized polyvinyl chloride (UPVC), or any other plastic known in the art.

Figure 2:
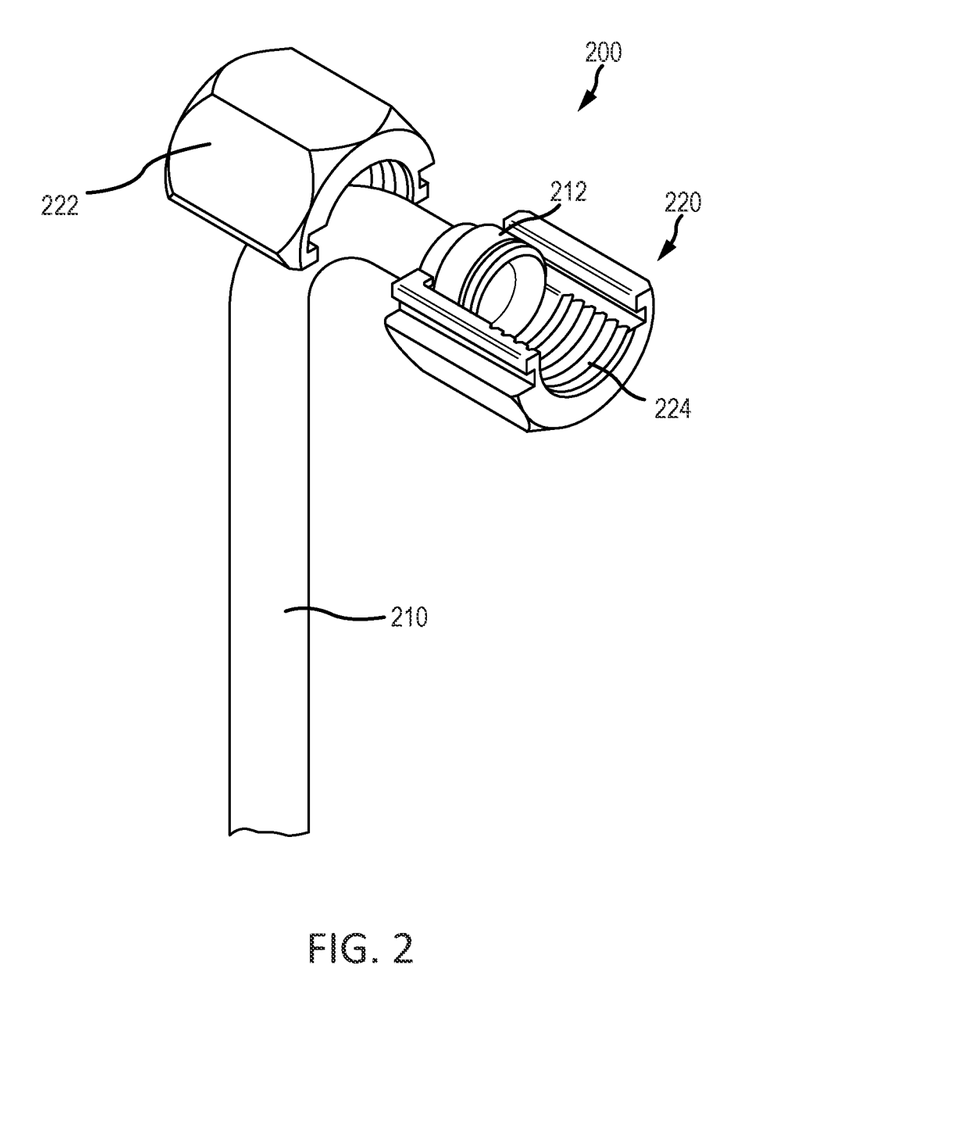
FIG. 2 illustrates tube assembly for use in an aircraft potable water system and associated drain system, in accordance with various embodiments.

Referring now to FIG. 2, a portion of a tube assembly 200 is illustrated in accordance with various embodiments. The tube assembly 200 may include a combined metal/plastic tubing apparatus 210, a fitting 212, and a nut assembly 220. In various embodiments, the combined metal/plastic tubing apparatus 210 has a metal portion and a plastic portion as described further herein. In various embodiments, the fitting 212 is a flared end. The flared end may include a cone seat configured to create a fluid seal with an adjacent fitting of an adjacent tube assembly. Although illustrated as comprising a flared end, the fitting 212 may be any fitting known in the art, such as a reducer, an adapter, a coupling, an elbow, a flanged fitting, a tee, a cross, a wye, or the like.

In various embodiments, the tube assembly 200 includes a nut assembly 220 having a bottom half 222 and a top half 224 that may be slidingly coupled together to create a male coupling of the tube assembly 200. Although illustrated as a split nut, any nut arrangement is within the scope of this disclosure. In various embodiments, the fitting 212 and the nut assembly 220 are made of metal. In various embodiments, structural loads experienced at an intersection between the fitting 212 and an adjacent coupling may be greater than a plastic coupling may handle.

In various embodiments, the fitting 212 is coupled to a metal portion of the combined metal/plastic tubing apparatus 210. The fitting may be coupled to the metal portion of the combined metal/plastic tubing apparatus 210 by any method known in the art, such as welding, swaging, brazing, or the like.

Figure 3:
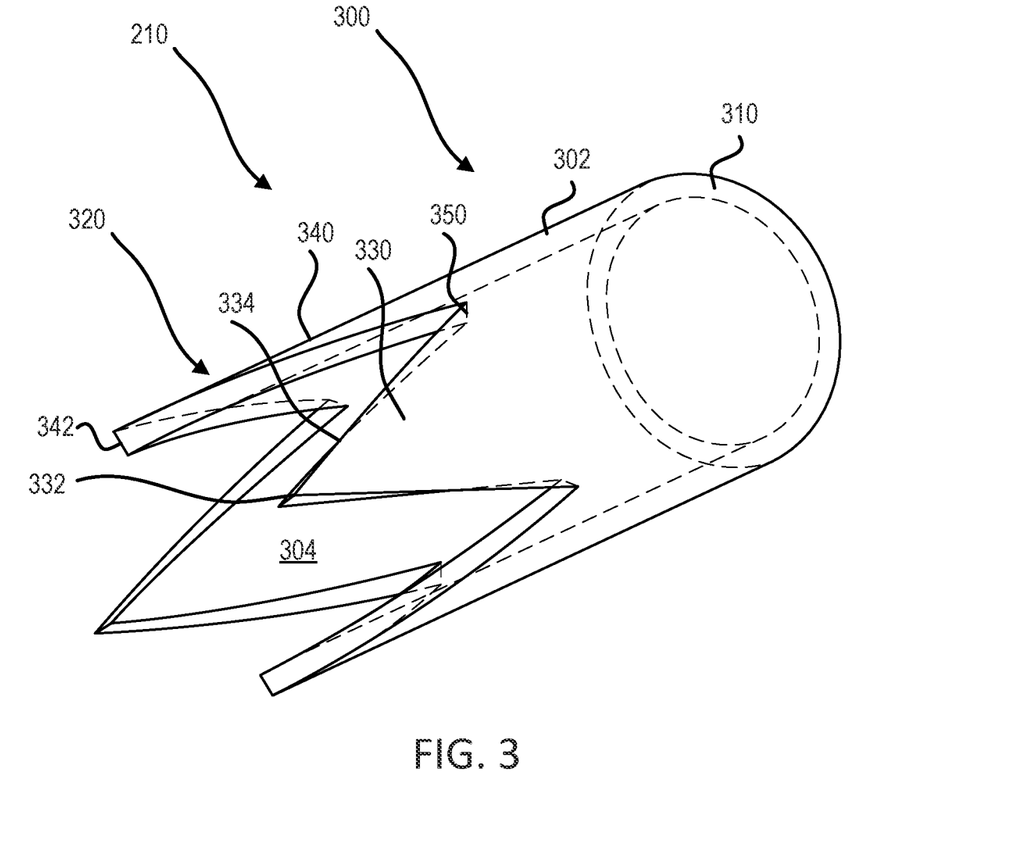
FIG. 3 illustrates a perspective view of a portion of a metal pipe portion of an apparatus, in accordance with various embodiments.

Referring now to FIG. 3, a metal pipe portion 300 of a combined metal/plastic tubing apparatus 210 from FIG. 2 with the plastic pipe portion removed for clarity is illustrated, in accordance with various embodiments. In various embodiments, the metal pipe portion 300 extends from a first end 310 to a transition end 320. In various embodiments, the metal pipe portion 300 may include any number of bends between the transition end 320 and the first end 310 based on operating environment, loads, or the like. In various embodiments, the metal pipe portion includes a radially outer surface 302 and a radially inner surface 304 disposed radially inward from the radially outer surface 302. In this regard, the metal pipe portion 300 may define a hollow cylinder, in accordance with various embodiments. A "plastic pipe portion" as defined herein, may include a natural rubber, a synthetic rubber, a silicone, an elastomer, a thermoplastic, a thermoset, a polymeric material, or the like.

In various embodiments, the transition end 320 includes a first tooth element 330 and a second tooth element 340. The first tooth element 330 is disposed circumferentially adjacent to the second tooth element 340. In various embodiment, each tooth element includes an axial peak. "Axial," as defined herein is defined as being in a parallel direction to a centerline defined by the radially inner surface 304 and/or the radially outer surface 302. In various embodiments, the axial peak of each tooth element may be the furthest axial distance from the first end 310. For example, the first tooth element 330 includes a first axial peak 332 and the second tooth element 340 includes a second axial peak 342. In various embodiments, the first axial peak 332 and the second axial peak 342 may each be a similar axial distance from the first end 310. In various embodiments, the first axial peak 332 and the second axial peak 342 may be different distances from the first end 310. In various embodiments, by having the first axial peak 332 and the second axial peak 342 similar axial distances from the first end 310, a thermal growth at the transition location may be more consistent, as described further herein.

In various embodiments, the first tooth element 330 and the second tooth element 340 may define a first axial valley 350. For example, the first tooth element 330 abuts the second tooth element 340 at the first axial valley 350. The first axial valley 350 has an axial distance from the first end that is less than the axial distances of the first axial peak 332 and the second axial peak 342.

In various embodiments, each tooth element includes a transition portion extending axially from a valley to a respective peak. For example, the first tooth element 330 includes a first transition portion 334 extending axially and circumferentially from the first axial valley 350 to the first axial peak 332. Although illustrated as being a smooth transition in FIG. 3, a transition portion of a respective peak may be various shapes as described further herein. In various embodiments, the transition end 320 includes at least two tooth elements. In this regard, a two tooth transition end may include two valleys disposed approximately 180 degrees apart and two peaks disposed approximately 90 degrees from a respective valley and approximately 180 degrees apart from adjacent peaks, in accordance with various embodiments.

In various embodiments, a transition end 320 may include any number of tooth elements greater than two and be within the scope of this. For example, larger diameter combined metal/plastic pipe apparatus may include significantly more tooth elements than a smaller combined metal/plastic pipe apparatus, in accordance with various embodiments.

In various embodiments the first end 310 may be coupled to a fitting (e.g., fitting 212 from FIG. 2) by any method known in the art. For example, the first end 310 may be welded to the fitting, brazed, to the fitting, or swaged to the fitting, in accordance with various embodiments. In various embodiments, the transition end 320 is coupled to a complimentary transition end of a plastic portion of the combined metal/plastic tubing apparatus 210. In this regard, the plastic portion may be coupled to the metal pipe portion 300 at the transition end 320 via injection molding or an adhesive, in accordance with various embodiments. In various embodiments, the transition end 320 of the metal pipe portion 300 may be made via additive manufacturing, electrical discharge machining (EDM), or the like.

Figure 4:
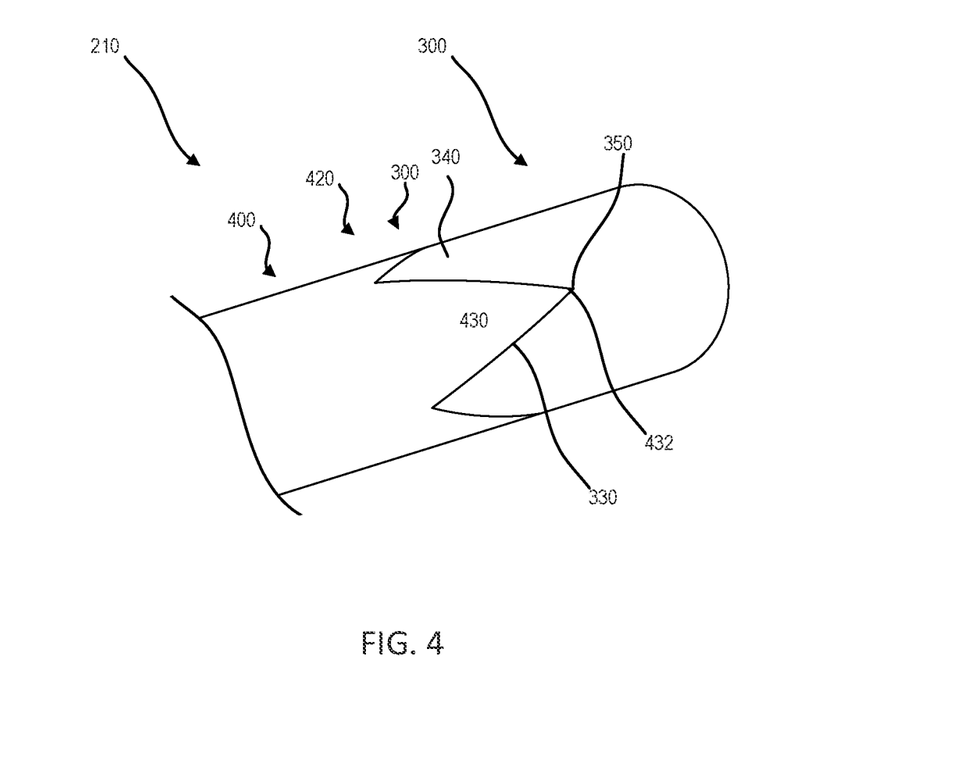
FIG. 4 illustrates a portion of a combined metal/plastic pipe apparatus, in accordance with various embodiments.

Referring now to FIG. 4, a portion of a combined metal/plastic tubing apparatus 210 from FIG. 2 with a plastic pipe portion 400, in accordance with various embodiments. In various embodiments, the plastic pipe portion 400 includes a transition end 420. In various embodiments, the transition end 420 of the plastic pipe portion 400 is complimentary in shape to the transition end 320 of the metal pipe portion 300. For example, a first axial peak 432 of a first tooth element 430 of the plastic pipe portion 400 is disposed adjacent to a first axial valley 350 defined by the first axial peak 332 and the second axial peak 342 of the metal pipe portion 300. In various embodiments, the first axial peak 432 may abut the first axial valley 350 in response to injection molding being used to couple the transition end 420 of the plastic pipe portion 400 to the transition end 320 of the metal pipe portion. In various embodiments, the first axial valley 350 may be separated from the first axial peak 432 by a thickness of an adhesive in response to an adhesive being used to couple to the metal pipe portion 300 to the plastic pipe portion 400.

In various embodiments, the plastic pipe portion 400 may extend from the transition end 420 to a second transition end, a terminus, or the like. The present disclosure is not limited in this regard.

Figure 5:
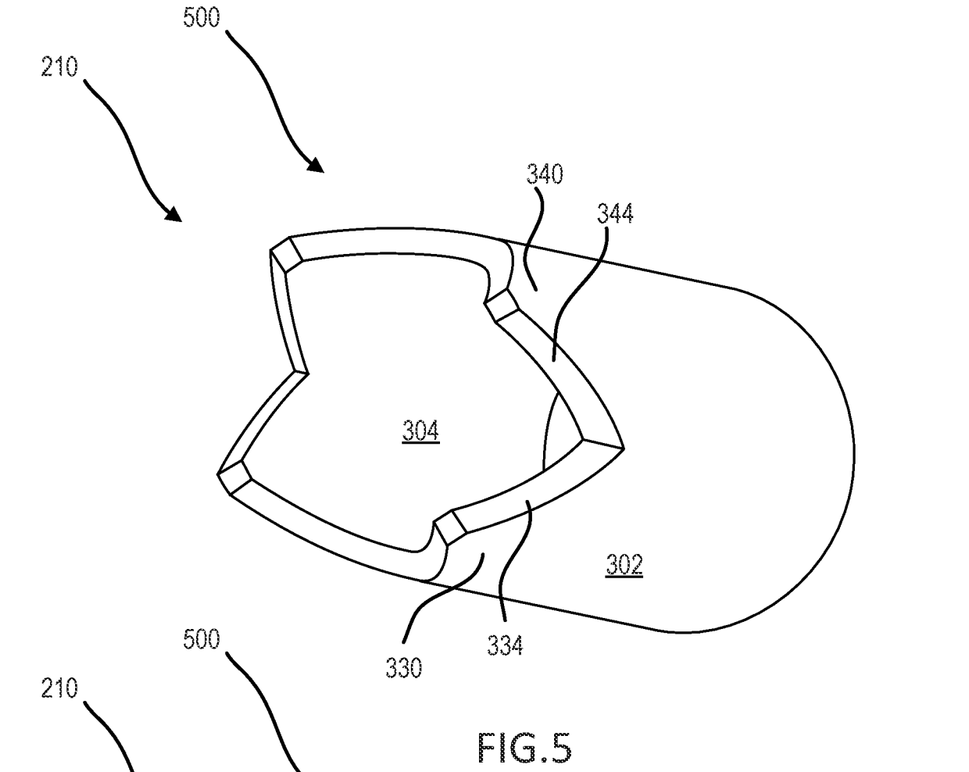
FIG. 5 illustrates a perspective view of a portion of a metal pipe portion of an apparatus, in accordance with various embodiments.
Figure 6:
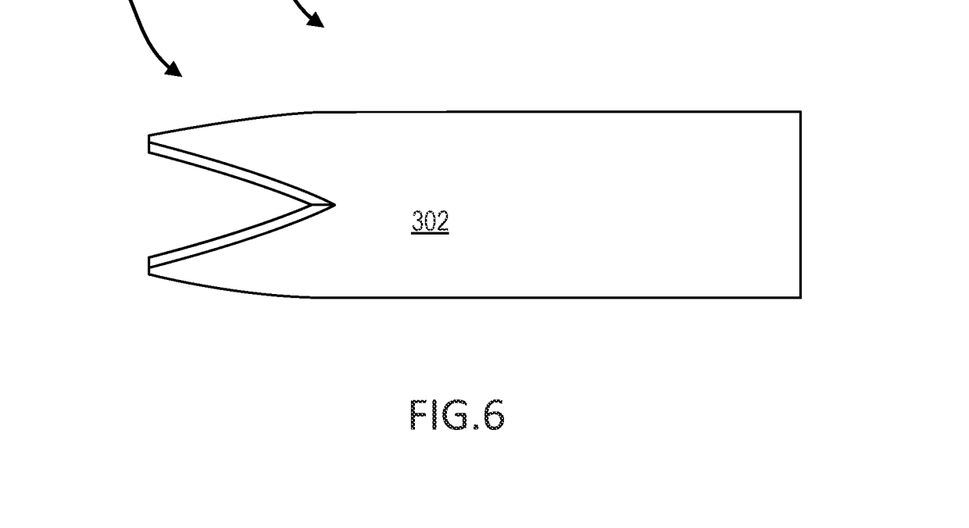
FIG. 6 illustrates a side view of the metal pipe portion of FIG. 5, in accordance with various embodiments.

Referring now to FIG. 5, a metal pipe portion 500 manufactured via end milling is illustrated, in accordance with various embodiments. The metal pipe portion 500 is in accordance with the metal pipe portion 300 except as further described herein. The metal pipe portion 500 includes the first tooth element 330 and the second tooth element 340. In various embodiments, a valley 550 between the first tooth element 330 and the second tooth element 340 may extend axially toward the peak and radially inward from the radially outer surface 302 to the radially inner surface 304 (as shown in FIG. 6). In this regard, an end mill may be able to remove the transition portions 324, 334 of adjacent axial peaks 332, 342 by subtractive manufacturing. Thus, stock metal piping may be used and bent to a desired specification and the transition end may be manufactured by an end mill or the like, as opposed to EDM processing as described previously or additive manufacturing. In various embodiments, a metal pipe portion in accordance with FIGS. 5 and 6 may be quicker and cheaper to manufacture relative to a metal pipe portion in accordance with FIGS. 3 and 4.

Figure 7:
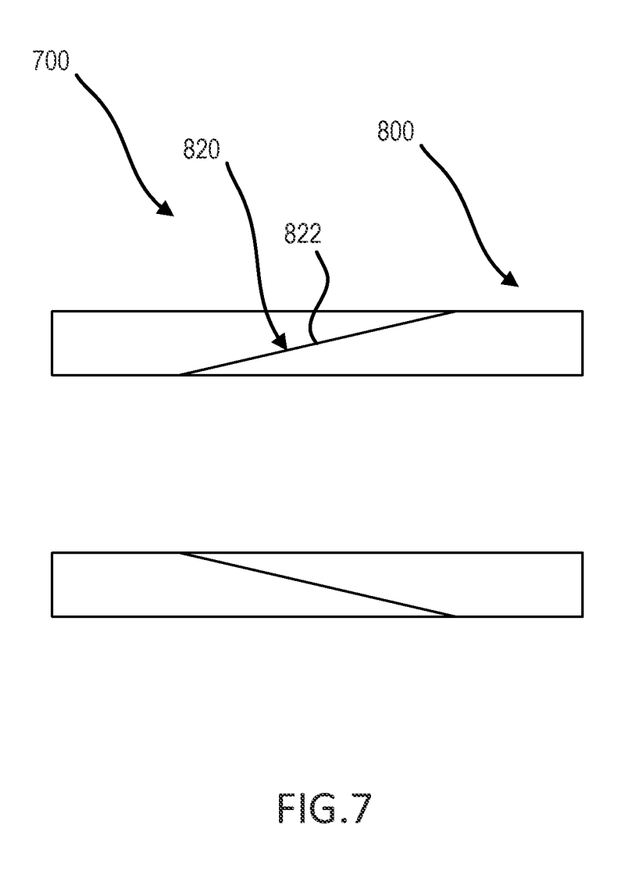
FIG. 7 illustrates a cross-sectional view of a portion of a combined metal/plastic pipe apparatus, in accordance with various embodiments.

Referring now to FIG. 7, a cross-sectional view of a combined metal/plastic pipe apparatus 700 is illustrated, in accordance with various embodiments. In various embodiments, the metal pipe portion 800 of the combined metal/plastic pipe apparatus 700 may be manufactured via turning on a computer numerical control (CNC) machine. Thus, a transition end 820 of the metal pipe portion 800 may be tapered from a radially outer surface 804 to a radially inner surface 802 of the metal pipe portion 800. In various embodiments, the transition end 820 includes a radial transition 822 having a taper in the radial direction. The radial transition 822 may be in the shape of a truncated cone. In various embodiments, the transition end 820 generates a sharp edge, which may be susceptible to damage during manufacturing.

In various embodiments, the transitions between a metal pipe portion and a plastic pipe portion as disclosed herein, a transition end of a metal pipe portion and a transition end of a plastic pipe portion as disclosed herein may create a transition region for the respective combined metal/plastic pipe apparatus. In various embodiments, the transition region may be configured to reduce thermal stresses between the metal and plastic interface during operation of a plumbing system (e.g., aircraft potable water system 100). In various embodiments, the transition regions as described herein may further provide a slower, more consistent transition in stiffness for the combined metal/plastic pipe apparatus, in accordance with various embodiments.

Figure 8:
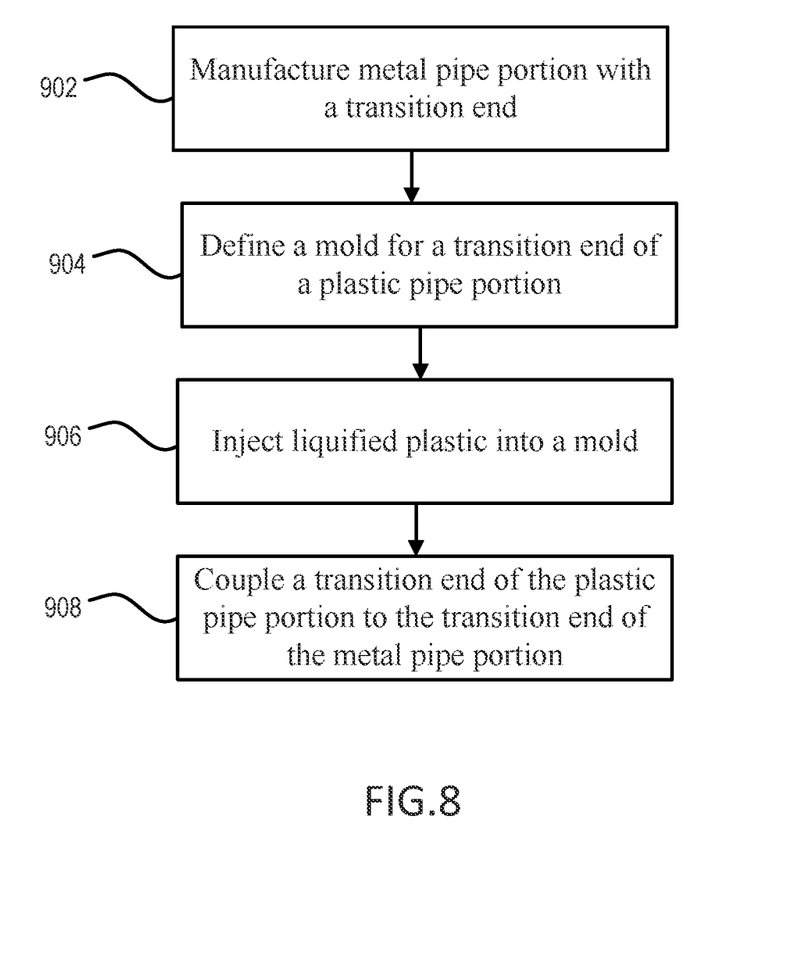
FIG. 8 illustrates a method of manufacturing a combined metal/plastic pipe apparatus, in accordance with various embodiments.

Referring now to FIG. 8, a method of manufacturing a combined metal/plastic pipe apparatus is illustrated, in accordance with various embodiments. The method 900 comprises manufacture a metal pipe portion with a transition end (step 902). The transition end may be in accordance with transition end 320 from FIG. 3 (i.e., from additive manufacturing or an EDM process), transition end 520 from FIG. 5 (i.e., via end milling an end of a stock metal pipe), or transition end 820 from FIG. 7 (i.e., via a turning process on a CNC machine).

In various embodiments, the method 900 further comprises defining a mold for a transition end of a plastic portion adjacent to the transition end of the metal pipe portion (step 904). In this regard, a mold may define a radially outer surface for a respective plastic pipe portion, a radially inner surface for the plastic pipe portion, and the transition end of the metal pipe portion may partially define the transition end of the plastic pipe portion, in accordance with various embodiments.

The method 900 may further comprise injecting liquified plastic into the mold from step 904 (step 906) and coupling the transition end of the metal pipe portion to the transition end of the plastic pipe portion (step 908) in response to allowing the liquified plastic to cool and solidify.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tube assembly, comprising:
   a tube comprising a metal pipe portion and a polymeric pipe portion;
   the metal pipe portion extending from a first end to a first transition end and defining a first radially outer surface and a first radially inner surface, the first transition end comprising a first tooth element and a second tooth element disposed circumferentially adjacent to the first tooth element, the first tooth element comprising a first peak, a first valley, and a first transition portion extending axially and circumferentially from the first valley to the first peak, the first peak spaced apart axially from the first valley, the first transition end including a radial transition having a taper in a radial direction; and
   the polymeric pipe portion having a second transition end and defining a second radially outer surface and a second radially inner surface, the second transition end having a complementary shape to the first transition end, the second transition end bonded to the first transition end, wherein:
   the tube is configured to transport a fluid during operation of the tube assembly,
   the fluid contacts the first radially inner surface of the metal pipe portion and the second radially inner surface of the polymeric pipe portion in response to transporting the fluid through the tube, and
   the second transition end bonded to the first transition end by injecting a liquified polymeric material into a mold and allowing the liquified polymeric material to cool, solidify, and form the polymeric pipe portion.

2. The tube assembly of claim 1, wherein:
   the first valley has a first axial distance from the first end,
   the first peak has a second axial distance from the first end, and the second axial distance is greater than the first axial distance.

3. The tube assembly of claim 2, wherein the first axial distance and the second axial distance are measured along a centerline defined by the first radially inner surface.

4. The tube assembly of claim 1, wherein the first valley extends radially and axially from the first radially outer surface to the first radially inner surface.

5. The tube assembly of claim 1, wherein the second tooth element comprises a second peak and a second transition portion, the second transition portion extending axially and circumferentially from the first valley to the second peak.

6. The tube assembly of claim 5, wherein the second transition end comprises a third tooth element having a third peak, the third peak disposed adjacent to the first valley of the first transition end.

7. The tube assembly of claim 1, wherein the first transition end and the second transition end define a transition region, wherein the transition region is configured to create a uniform transition in stiffness between the metal pipe portion and the polymeric pipe portion.

8. The tube assembly of claim 1, wherein the first end is coupled to a metal fitting.

9. A tube assembly, comprising:
a metal pipe portion extending from a first end to a first transition end, the first transition end comprising a first tooth element and a second tooth element disposed circumferentially adjacent to the first tooth element, the first tooth element comprises a first peak, a first valley, and a first transition portion extending axially and circumferentially from the first valley to the first peak, the first peak spaced apart axially from the first valley, the first transition end including a radial transition having a taper in a radial direction;
a polymeric pipe portion having a second transition end, the second transition end having a complementary shape to the first transition end, the second transition end bonded to the first transition end; and
a metal fitting coupled to the first end, the metal fitting configured to couple the tube assembly to an adjacent tube assembly, wherein:
in response to coupling the tube assembly to the adjacent tube assembly via the metal fitting, the metal pipe portion and the polymeric pipe portion are fluidly coupled to the adjacent tube assembly, and
the second transition end bonded to the first transition end by injecting a liquified polymeric material into a mold and allowing the liquified polymeric material to cool, solidify, and form the polymeric pipe portion.

10. The tube assembly of claim 9, wherein:
the first valley has a first axial distance from the first end,
the first peak has a second axial distance from the first end, and
the second axial distance is greater than the first axial distance.

11. The tube assembly of claim 10, wherein the first valley extends radially and axially from a radially outer surface of the metal pipe portion to a radially inner surface of the metal pipe portion.

12. The tube assembly of claim 9, wherein the second tooth element comprises a second peak and a second transition portion, the second transition portion extending axially and circumferentially from the first valley to the second peak.

13. The tube assembly of claim 12, wherein the second transition end comprises a third tooth element having a third peak, the third peak disposed adjacent to the first valley of the first transition end.

14. The tube assembly of claim 9, wherein the first transition end and the second transition end define a transition region, wherein the transition region is configured to create a uniform transition in stiffness between the metal pipe portion and the polymeric pipe portion.

15. The tube assembly of claim 9, wherein the metal fitting is one of welded or brazed to the metal pipe portion.

16. The tube assembly of claim 9, wherein the tube assembly is configured to transport fluid therethrough.

17. A water system comprising:
the tube assembly of claim 9; and
the adjacent tube assembly coupled to the metal fitting.

* * * * *